(12) United States Patent
Klinghult et al.

(10) Patent No.: US 10,318,074 B2
(45) Date of Patent: Jun. 11, 2019

(54) TOUCH-SENSING OLED DISPLAY WITH TILTED EMITTERS

(71) Applicant: Flatfrog Laboratories AB, Lund (SE)

(72) Inventors: Gunnar Klinghult, Lund (SE); Ivan Karlsson, Lund (SE)

(73) Assignee: FlatFrog Laboratories AB, Lund (SE)

( * ) Notice: Subject to any disclaimer, the term of this patent is extended or adjusted under 35 U.S.C. 154(b) by 400 days.

(21) Appl. No.: 15/008,018

(22) Filed: Jan. 27, 2016

(65) Prior Publication Data

US 2016/0224144 A1   Aug. 4, 2016

(30) Foreign Application Priority Data

Jan. 30, 2015 (SE) ...................................... 1550096

(51) Int. Cl.
*G06F 3/042* (2006.01)

(52) U.S. Cl.
CPC ............ *G06F 3/042* (2013.01); *G06F 3/0428* (2013.01); *G06F 2203/04103* (2013.01); *G06F 2203/04109* (2013.01)

(58) Field of Classification Search
CPC .................. G06F 3/042; G06F 3/0428; G06F 2203/04103; G06F 2203/04109
See application file for complete search history.

(56) References Cited

U.S. PATENT DOCUMENTS

| | | | |
|---|---|---|---|
| 3,440,426 A | 4/1969 | Bush | |
| 3,553,680 A | 1/1971 | Cooreman | |
| 3,673,327 A | 6/1972 | Johnson et al. | |
| 4,129,384 A | 12/1978 | Walker et al. | |
| 4,180,702 A | 12/1979 | Sick et al. | |
| 4,209,255 A | 6/1980 | Heynau et al. | |
| 4,213,707 A | 7/1980 | Evans, Jr. | |
| 4,254,333 A | 3/1981 | Bergström | |
| 4,254,407 A | 3/1981 | Tipon | |
| 4,294,543 A | 10/1981 | Apple et al. | |
| 4,346,376 A | 8/1982 | Mallos | |
| 4,420,261 A | 12/1983 | Barlow et al. | |

(Continued)

FOREIGN PATENT DOCUMENTS

| CN | 201233592 Y | 5/2009 |
|---|---|---|
| CN | 101644854 A | 2/2010 |

(Continued)

OTHER PUBLICATIONS

Ahn, Y., et al., "A slim and wide multi-touch tabletop interface and its applications," BigComp2014, IEEE, 2014, in 6 pages.

(Continued)

*Primary Examiner* — Robert J Michaud

(74) *Attorney, Agent, or Firm* — Knobbe Martens Olson & Bear, LLP

(57) ABSTRACT

A touch-sensitive display, comprising a transmissive panel defining the touch surface, a first set of OLED emitters forming display pixels, a second set of OLED emitters configured to emit light via an adjacent cell into the transmissive panel for propagation therein via total internal reflection, and a set of detectors configured to receive light from the second set of OLED emitters after the light has propagated inside the transmissive panel via total internal reflection. The first set and the second set of OLED emitters are arranged on the same substrate.

15 Claims, 8 Drawing Sheets

(56) References Cited

U.S. PATENT DOCUMENTS

| | | |
|---|---|---|
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fahraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B2 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |

(56) References Cited

U.S. PATENT DOCUMENTS

| | | |
|---|---|---|
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fähraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |

(56) References Cited

U.S. PATENT DOCUMENTS

| | | |
|---|---|---|
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1* | 8/2009 | Kalgutkar ............... B32B 5/16 503/201 |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönka et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1* | 5/2013 | Wassvik ............... G06F 3/042 345/175 |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1 | 6/2013 | Holmgren et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |

(56) References Cited

U.S. PATENT DOCUMENTS

| | | |
|---|---|---|
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |

(56) References Cited

FOREIGN PATENT DOCUMENTS

| WO | WO 2010/006882 A2 | 1/2010 |
|---|---|---|
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/133756 A1 | 9/2013 |
| WO | WO 2013/133757 A2 | 9/2013 |
| WO | 2013176613 | 11/2013 |
| WO | 2013176614 | 11/2013 |
| WO | 2013176615 | 11/2013 |
| WO | WO 2014/055809 A1 | 4/2014 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

Johnson, M., "Enhanced Optical Touch Input Panel", IBM Technical Disclosure Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/~joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

Office Action dated Aug. 13, 2015, in connection with Sweden Application No. 1550096-0, filed Jan. 30, 2015.

* cited by examiner

US 10,318,074 B2

TOUCH-SENSING OLED DISPLAY WITH TILTED EMITTERS

RELATED APPLICATION DATA

This application claims the benefit of priority of Swedish Patent Application No. 1550096-0 filed on Jan. 30, 2015, and titled "Touch-Sensing OLED Display With Tilted Emitters", which is incorporated by reference herein in its entirety.

FIELD OF THE INVENTION

The present invention relates to touch sensing systems and especially to OLED display devices that offer touch sensitivity.

BACKGROUND

Display devices with touch sensitivity are used today in a wide variety of applications such as touch pads in laptop computers, all-in-one computers, mobile phones and other hand-held devices, etc. There is often a desire to provide these electronic devices with a relatively large touch sensitive display and still let the devices be small and thin. However, various solutions provided in the art to date often have one or more drawbacks, such as undesired thickness and complexity, or for light-based devices, limitations on the amount of light available from emitters for touch detection.

SUMMARY OF THE DISCLOSURE

In one aspect, embodiments of the invention are touch-sensitive displays which comprise a transmissive panel defining the touch surface, a first set of OLED emitters forming display pixels, a second set of OLED emitters configured to emit light via an adjacent cell into the transmissive panel for propagation therein via total internal reflection, and a set of detectors configured to receive light from the second set of OLED emitters after the light has propagated inside the transmissive panel via total internal reflection; wherein the first set and the second set of OLED emitters are arranged on the same substrate.

In various alternative embodiments, other aspects include an adjacent cell as an OLED emitter of the first set, an adjacent cell as a light transmissive aperture cell, or a light transmissive aperture cell comprising plastic material, transparent OLED carrier or OLED compound.

In one embodiment, each OLED emitter of the second set is configured with an at least partially reflective layer between the transmissive panel and an active material of the OLED emitter of the second set. The reflective layer is preferably at least 70% reflective. The reflective layer is preferably less than 50% transmissive.

In other embodiments, the reflective layer comprises silver, or an anode or cathode of the OLED emitter. The reflective layer also may be in a plane that is at an angle of 0-45 degrees to a plane of the touch surface.

In further embodiments, the OLED emitter may be configured with an anode and a cathode layer arranged perpendicular to the plane of the panel. The touch-sensing display panel may be provided with a reflective material between a back substrate and the aperture cell. Alternatively, the touch-sensitive display may comprise organic photo detectors.

Another aspect of the invention is a method of producing a touch sensitive display panel, comprising the steps of: providing a transparent substrate; providing a matrix of image pixels and emitter pixels at a surface of the substrate; providing at least one of the emitter pixels with an adjacent cell, configured to allow light to be emitted from the emitter pixel to the transparent substrate via the adjacent cell; providing a cover sheet over the pixel matrix; and sealing the cover sheet to the substrate.

A further aspect of the invention is a method of producing a touch sensitive display panel, comprising the steps of: providing a carrier sheet; providing a matrix of image pixels and emitter pixels on the carrier sheet; providing at least one of the emitter pixels with an adjacent cell; providing a transparent substrate over the image pixels and the emitter pixels; sealing the transparent substrate to the carrier sheet; wherein the adjacent cell is configured to allow light to be emitted from the emitter pixel to the transparent substrate via the adjacent cell.

Still other objectives, features, aspects and advantages of the present invention will appear from the following detailed description, from the attached claims as well as from the drawings.

BRIEF DESCRIPTION OF THE DRAWINGS

Embodiments of the invention will now be described in more detail with reference to the accompanying schematic drawings.

DETAILED DESCRIPTION

Figure 1:
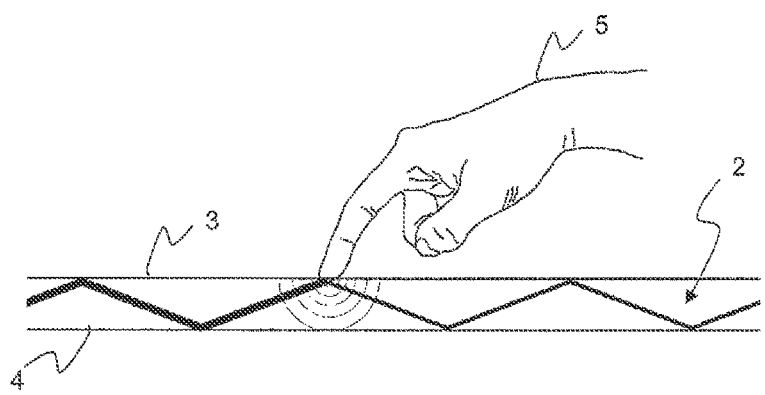
FIG. 1 is section view of a touch-sensing FTIR system.

The present invention relates to OLED displays and the use of techniques for effectively emitting light into a panel for providing touch sensitivity to a display apparatus. The invention provides an energy efficient and integrated touch-sensing display panel 1, operating by means of FTIR.

Throughout the description the same reference numerals are used to identify corresponding elements.

FIG. 1 illustrates the operating principle of a touch-sensing FTIR system. In the side view of FIG. 1 a beam of light is propagated by total internal reflection (TIR) inside a planar (two-dimensional) light guide 2. The light guide 2 comprises opposing surfaces 3, 4 which define a front (or top) boundary surface 3 and a rear (or bottom) boundary surface 4 of the light guide 2. Each boundary surface 3, 4 reflects light that impinges on the boundary surface from within the light guide 2 at an angle that exceeds the so-called critical angle, as is well-known to the skilled person. When an object 5 is brought sufficiently close to one of the boundary surfaces (here, the top surface 3), part of the beam may be scattered by the object 5, part of the beam may be absorbed by the object 5, and part of the beam may continue to propagate in the light guide by TIR. Thus, when the object 5 touches the top surface 3, which forms a "touch surface", the total internal reflection is frustrated and the energy of the transmitted light is decreased, as indicated by the thinned lines to the right of the object 5. This phenomenon is known as FTIR (Frustrated Total Internal Reflection) and a corresponding touch-sensing device may be referred to as an "FTIR system".

Although not shown in FIG. 1, the FTIR system typically includes an arrangement of emitters and detectors, which are distributed along the peripheral region of the touch surface 3. Light from an emitter is introduced into the light guide 2 and propagates by TIR to one or more detectors. Each pair of an emitter and a detector defines a "detection line", which corresponds to the propagation path from the emitter to the detector. Any object that touches the touch surface along the extent of the detection line will thus decrease or attenuate the amount of light received by the detector. The emitters and detectors are typically arranged to define a grid of intersecting detection lines on the touch surface, whereby each touching object is likely to cause an attenuation of several non-parallel detection lines.

The arrangement of detectors is electrically connected to a signal processor, which acquires and processes an output signal from the arrangement. The output signal is indicative of the power of transmitted light at each detector. The signal processor may be configured to process the output signal for extraction of touch data, such as a position (e.g. x, y coordinates), a shape or an area of each touching object.

While FIG. 1 illustrates the working principle of FTIR touch as such, the invention relates to a touch-sensing display panel in which an FTIR touch-sensing mechanism is integrated with a display, and with increased efficiency in coupling light into the light guide so that it may propagate therein with total internal reflection, as will be shown with reference to the subsequent drawings.

Figure 2A:
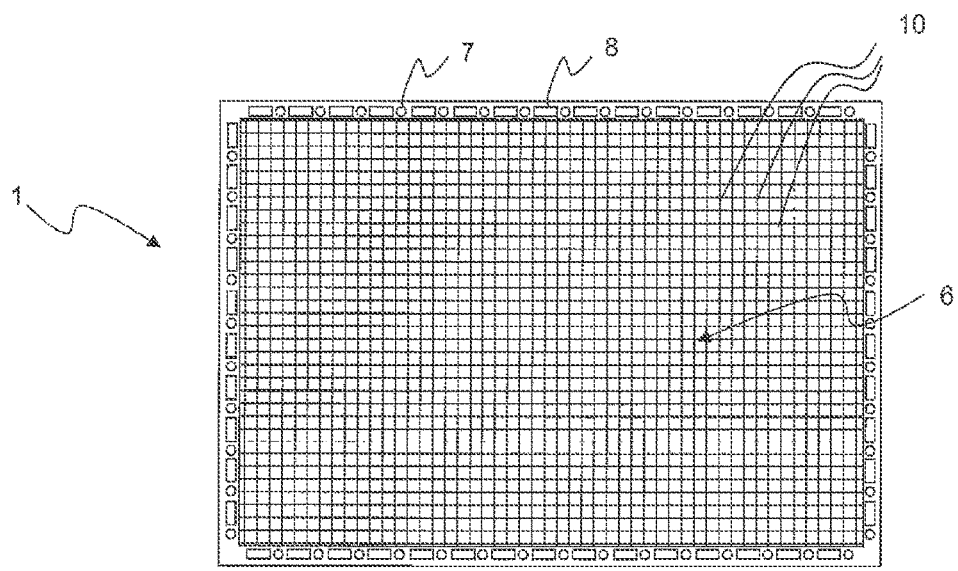
FIGS. 2A and 2B are top plan and partial section views of one embodiment of the invention.
Figure 2B:
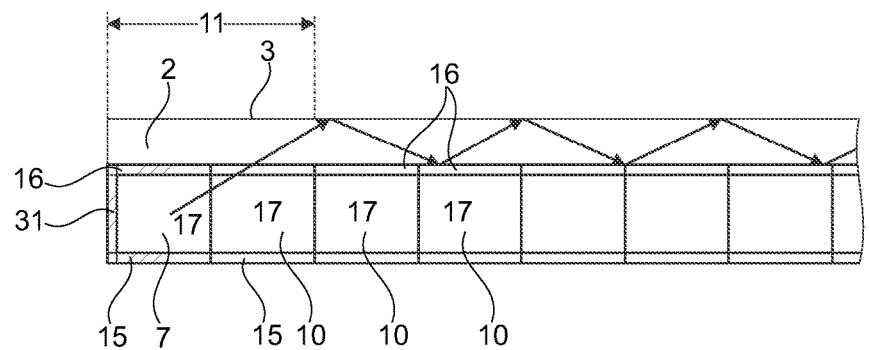

FIG. 2A is a top plan view and FIG. 2B is a partial side view of a touch-sensing display panel 1 according to an embodiment of the invention. The touch-sensing display panel 1 is implemented as a combination of a light transmissive light guide 2 that defines a front touch surface 3, and a dual-function display pixel matrix 6 which is configured to both display images through the front surface 3 and provide touch sensitivity to the front surface 3 via FTIR.

As seen in the plan view of FIG. 2A, a plurality of emitters 7 and detectors 8 (collectively referred to as "touch-sensor elements") are arranged in interleaved fashion underneath a peripheral region of the light guide 2. It should be noted, though, that this interleaved arrangement is merely one example of positioning the emitters 7 and detectors 8. Another example may be to arrange emitters along two sides, and detectors along the other two sides, of the panel 1. A further example is to arrange the emitters and detectors so that they are alternated two emitters and two detectors. Other arrangement of emitters and detectors are disclosed in WO2013/176615, WO2013/176614, WO2013/176613, which are all incorporated herein by reference. In the drawings, for illustrative purposes only, emitters 7 and detectors 8 are represented by circles and rectangles, respectively. Furthermore, a center region of the light guide 2 is aligned with a matrix of image-forming elements or picture elements ("pixels" or "pixel elements") 10 that define a display area for displaying visual images in monochrome or color. The pixels 10, which are indicated as a matrix of square elements in FIG. 2A, may be formed by any available integrated display technology based on semiconductor technology, including but not limited to OLED (Organic Light-Emitting Diode), PLED (Polymer Light-Emitting Diode), LED (Light Emitting Diode), etc.

In the following, it is assumed that the display pixel matrix 6 in FIGS. 2A-2B is based on OLEDs. The display pixel matrix 6 comprises a rear electrode (e.g. an anode) 15, and a front electrode (e.g. a cathode) 16, and an intermediate organic structure 17, which may be formed by one or more organic layers, as is known in the art. The front electrode layer 16 is transparent and may e.g. be made of indium tin oxide (ITO). The pixels 10 of the display area may be defined by patterning of the electrode layers 15, 16, and optionally by patterning of the organic structure 17. Each pixel 10 may include one or more sub-pixels, which may be formed by selective doping to generate different light emissive properties of the different sub-pixels, e.g. such that the sub-pixels emit red, green and blue light, respectively. Different designs of a combined thin film transistor (TFT) structure and OLED pixels are shown in U.S. 20080150848, which is incorporated herein by reference.

The emitters 7 and detectors 8 in the peripheral region 11 may also be defined by patterning of the electrode layers 15, 16 and/or by patterning of the organic structure 17. It is well-known that junction diodes, such as LEDs and OLEDs, are operable as both emitters and detectors by application of proper control voltages to the junction diodes. Thus, the emitters 7 and the detectors 8 may be implemented by the same or similar elements, whereby the emitters 7, the detectors 8 and the pixels 10 are formed as portions in the organic structure 17 that are selectively and individually addressable via the electrode layers 15, 16. In this embodiment, the combination of electrode layers 15, 16 and organic structure thus forms a composite substrate in which emitters 7, detectors 8 and pixels 10 are integrated.

Preferably, the light guide 2 is included as a transparent substrate during manufacture of the display pixel matrix 6, e.g. as a backing for supporting the front electrode 16. Alternatively, the OLEDs may be built up from the side of the lower electrode layer 15, and in that case the light guide 2 is a cover sheet that is nevertheless required for an OLED display, due to its sensitivity to moisture. Generally, the light guide 2 may be made of any material that transmits a sufficient amount of radiation in the relevant wavelength range to permit a measurement of transmitted energy, so that touch determination can be performed. Such material includes glass, poly(methyl methacrylate) (PMMA), polycarbonates (PC), PET (poly(ethylene terephthalate)) and TAC (Triallyl cyanurate). The light guide 2 may be flat or curved and may be of any shape, such as circular, elliptical or polygonal. It is possible that the light guide 2 is comprised of a plurality of material layers, e.g. for the purpose of scratch-resistance, anti-fingerprint functionality, anti-reflection or other functional purpose.

The use of OLED technology makes it possible to design the display unit 6 as a thin and flexible unit, if desired. It is also possible to design the emitters 7 and the pixels 10 with different emissive properties, if desired. For example, the wavelength(s) at which the organic structure 17 emits light may be readily tuned with appropriate dopants during manufacture. Furthermore, the display unit 6 does not need to have a backlight. Still further, the size and shape of the image-forming pixels 10, emitters 7 and detectors 8 are readily set in manufacture. It may e.g. be advantageous to make the emitters 7 and/or the detectors 8 larger than the pixels 10. The amount of light emitted by an OLED element increases with its surface area, and it may thus be desirable to make the emitters 7 larger than the pixels 10 to increase the amount of emitted light from each emitter 7. OLEDs are known to have relatively small heat losses, which enables the use of large emitters 7 without a need for additional cooling measures. The detectors 8 may also be made larger than the pixels 10 in order to improve the light gathering ability of the detectors 8 and decrease noise. In alternative embodiments, a number of detector elements 8 are used as one detector, and therefore coupled to output a common measurement signal. Another advantage of OLED technology is that OLEDs typically have a large index of refraction, typically in the range of 1.7-2 or even higher. This allows light to be emitted from the OLED in a large solid angle, which may serve to favorably increase the divergence angle of the respective fan beam inside the light guide 2. This is useful in systems where the light from an emitter 7 should be received by a plurality of detectors 8, i.e. to generate multiple detection lines from the emitter 7.

As noted above, it is conceivable that the light guide 2 is a transparent substrate or backing for the front electrode layer 16. The process for manufacturing the display unit 6 may be adapted to add a layer of lower index of refraction between the electrode layer 16 and the transparent backing, i.e. the light guide 2, if needed to sustain light propagation by TIR therein. As is well known in the art, each pixel 10 may be configured to emit light in one color only, or may comprise several sub pixels configured to emit light in different colors, such as RGB (red, green, blue). Such sub pixels may be formed by stacking OLEDs, i.e. forming them on top of each other, or by placing them next to each other within the area of the pixel element 10. So, each pixel 10 may include one or several OLEDs. Emitters 7 and detectors 8 are arranged at the peripheral region. However, only an emitter is shown in the drawing. Preferably, as already described, the emitter 7 and detector 8 are OLEDs, formed integrally with the image-forming pixels 10. However, the use of the emitter 7 and detector 8 on the one hand, and the image-forming pixel elements 10 on the other hand, are quite different.

In OLED displays, the pixel elements are adapted to emit light through the panel in a direction along the normal of the touch surface. The emitter 7, however, will only be useful if its light is captured within the light guide 2 to propagate via TIR towards the detector 8. In the prior art of touch-sensing displays with integrated OLED displays, the emitter is driven to emit light in a wide cone into the light guide, whereby only some of the light has an angle such that it can propagate inside the light guide with total internal reflection. The angle required for the light to propagate with total internal reflection must be larger than the critical angle. The critical angle may be calculated from Snell's law, which is well known to the person skilled in the art. In the touch sensitive OLED displays of the prior art, a large part of the emitted light is emitted at angles smaller that the critical angle. This part of the light will therefore pass out through the front surface of the light guide and will not propagate inside the light guide with TIR. Therefore, this portion of the light cannot be used for touch detection. The present invention allows the part of the emitted light that can be propagated inside the light guide to be increased.

FIG. 2B is a partial section view of the touch-sensing display panel in FIG. 2A. Illustrated are a light transmissive light guide 2, an emitter 7 and image forming pixel elements 10, which may be comprised of red, green and blue emitting sub-pixels. The emitter emits light for propagation inside the light guide. The light may be of any wavelength, e.g. infrared light, visible light or UV light. In preferred embodiments, IR light is used, preferably in the range of 800-940 nm, e.g. 850 nm. In the embodiment illustrated in FIG. 2B the emitter anode 15 and the emitter cathode 16 are made of materials that are reflective in the emitter wavelength. The reflective material stops the emitted light from being emitted up through the light guide and the front surface. Therefore the light can only be emitted via a side edge of the emitter, via an adjacent pixel element, into the light guide. Consequently, more light will enter the light guide at an angle that allows propagation by TIR inside the light guide. To stop light from being emitted towards the edges of the light guide, a reflective side layer 31 may be added to the emitter at the side facing away from the center of the display.

Figure 2C:
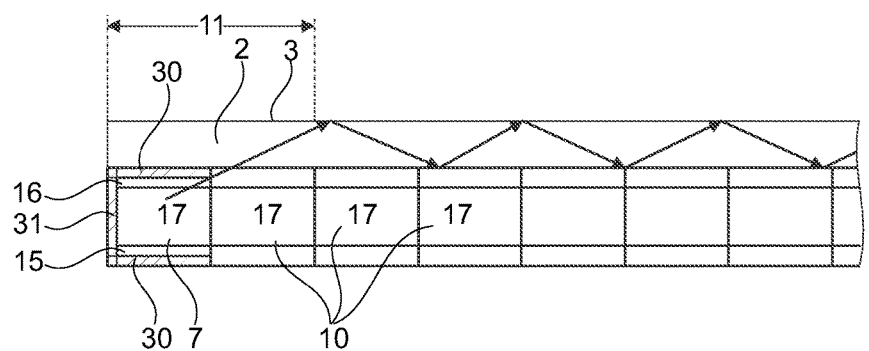
FIG. 2C illustrates an alternative embodiment to the embodiment of FIGS. 2A and 2B.

The reflective anode 15 and/or cathode 16 may be made fully or partially of a reflective material or a combination of reflective materials, e.g. silver, copper or nano materials such as copper with nano silver. In FIG. 2C, an alternative embodiment is illustrated. In this embodiment the cathode 16 and anode 15 of the emitter 7 are transparent and coated with a layer 30 that is reflective to light of the emitter wavelength. The anode 15 and cathode 16 of the emitter OLED may be made from the same material and in the same process as the anode 15 and cathode 16 of the image forming elements 10. This may make manufacturing easier and cheaper. The optional reflective layer 31 is also shown in FIG. 2C.

Figure 3:
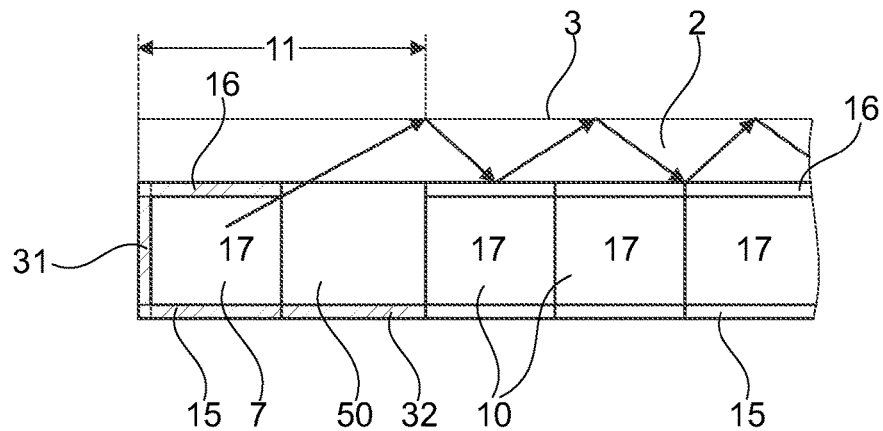
FIG. 3 is a partial section view of an alternative embodiment of the invention, wherein the touch-sensing FTIR system comprises a transparent aperture cell.

FIG. 3 illustrates an embodiment of the invention in which the touch sensing display panel 1 also comprises aperture cells 50. FIG. 3 is a partial section view of a touch-sensing display panel, similar to the partial section view of the touch-sensing display panel in FIG. 2B. As in FIG. 2B, there are illustrated a light transmissive light guide 2, an emitter 7 and an image forming pixel element 10. The function and details are the same as in the previous embodiments with the difference that there is an aperture cell 50, or a gap, between the emitter 7 and the pixel elements 10. As in the previous embodiments, light emitted by the emitter is stopped from entering the light guide 2 via the top of the emitter and is instead emitted through the side of the emitter. Instead of propagating via an adjacent display element 10, the light propagates from the emitter 7 via an aperture cell 50 into the light guide 2. The aperture cell 50 may be made of a plastic material such as PET (Polyethylene terephthalate) or PEN (Polyethylene naphthalate) or from transparent OLED carrier or compound. The aperture cell 50 is preferably added in the same process with the pixel elements 10, the emitters 7 and the detectors 8. Some of the light may be propagating via the aperture cell 50 towards the back of the display. To stop this light from leaving the display and instead allow this light to be re-directed into the light guide 2, the aperture cell 50 may comprise a reflective layer 32 at the bottom, i.e. at the side facing the back of the display (as shown). This reflective layer 32 may be made of the same material as the previously discussed reflective side layers 31 or as the reflective anode or cathode layers. An advantage of aperture cells 50 is that it is then possible to choose a material of the aperture cell 50 that has a refractive index better suited for emitting light into the panel at a desired angle. A further advantage is that all pixel elements can be covered with an optical layer to sustain TIR, if such a layer is needed. The optical layer will be described in more detail with reference to FIG. 7. For similar reasons it may be advantageous to have aperture cells between pixel elements 10 and detectors 8, such that light propagating inside the light guide 2 via TIR passes an aperture cell 50 before being detected by a detector 8.

Figure 4:
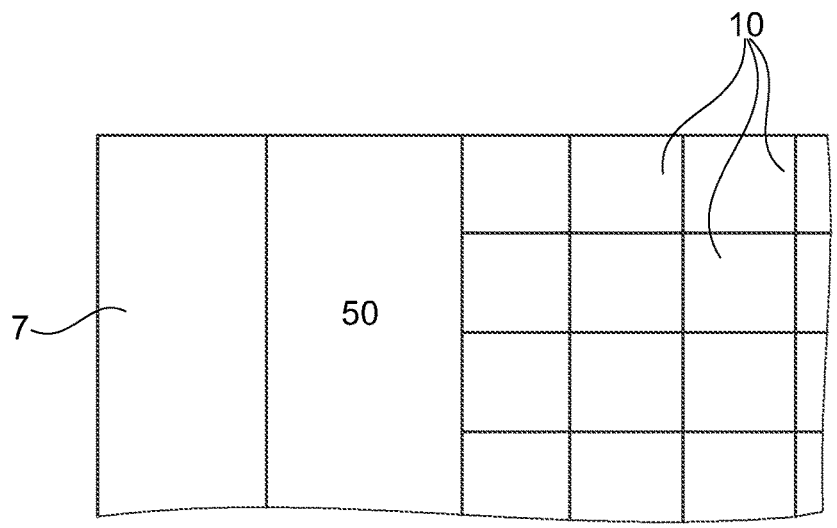
FIG. 4 is a partial top plan view of an alternative embodiment of the invention, wherein emitters are larger than pixel elements.

As previously discussed, it may be advantageous for the emitters 7 to be larger than the pixel elements 10. FIG. 4 is a partial top plan view of such an alternative embodiment. As in the embodiment of FIG. 3 there is a light transmissive light guide 2 (not shown), an emitter 7 and image forming pixel elements 10. The function and details are the same as discussed with reference to the previous embodiments with the difference that the emitter 7 and the aperture cell 50 between the emitter 7 and the pixel elements 10 are larger than the individual pixel elements. As in the previous embodiments light emitted by the emitter is stopped from entering the light guide 2 via the top of the emitter and is instead emitted through the side of the emitter. The light may propagate from the emitter 7 into the light guide 2 via an adjacent pixel element 10 or, as shown, the light may propagate from the emitter 7 via an aperture cell 50 into the light guide 2. In FIG. 4 the aperture cell 50 is illustrated as being the same size as the large emitter 7, i.e. larger than the pixel elements. This allows light from the large emitter to propagate via a large aperture cell 50. In an alternative embodiment it is instead conceivable to let the light from each emitter propagate through a plurality of smaller aperture cells 50 into the light guide 2.

An advantage of a larger emitter 7 is that more light may be emitted by the emitter, as the amount of light that can be emitted by a semiconductor emitter is proportional to the area of the emitter surface. Another advantage is that emitters may be shaped wide along the peripheral part of the panel and therefore narrow in the direction orthogonal of the peripheral part, and still have a large enough surface area to emit the amount of light required for touch detection. The peripheral parts of the display, not comprised of image forming elements, may thereby be made narrow and still allow for stronger emitting emitters. In one embodiment the emitter 7 is larger than the pixel elements 10, but the aperture cell is omitted. Light emitted from an emitter 7 will thus pass through a plurality of pixel elements 10 towards the light guide 2. It is also conceivable to let the detectors 8 be larger than the pixel elements 10, with or without aperture cells 50. As already mentioned larger detectors can receive more light with decreased noise.

Figure 5:
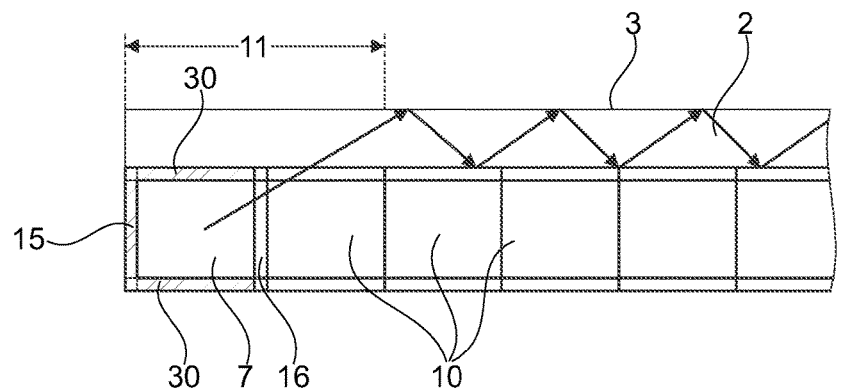
FIG. 5 is a partial section view of an alternative embodiment of the invention, wherein the emitter is configured with transparent and vertical anode and cathode.

In a further embodiment of the invention the cathode and anode of the emitter 7 are in a plane of a normal to the touch surface, the cathode and anode are thus vertical as shown in FIG. 5. In this embodiment the emitter 7 is driven to emit light sideways via one or more adjacent aperture cells 50 (not shown) or pixel element 10. The cathode is transparent to the light emitted by the emitter 7. The top, and optionally also the bottom, of the emitter is covered with a reflective layer 30. The anode of the emitter may also be made of transparent material and coated with a reflective layer or, as shown, be made of a reflective material such as those discussed in relation to previous embodiments. An advantage of vertical cathode and anode for the emitters 7 is that the same material may be used as for cathode and anode of the pixel elements 10. In one embodiment the cathode 16 may be configured to act as an aperture cell 50. In this embodiment the transparent anode is made thick so that the light can propagate from the emitter via the anode into the light guide. Alternatively, if the anode is not sufficiently thick to allow all light to propagate directly to the light guide, the anode may act as a partial aperture cell. Some of the light will then propagate from the emitter via the anode into the light guide, and some of the light will propagate via the anode and an adjacent pixel element into the light guide.

Figure 6:
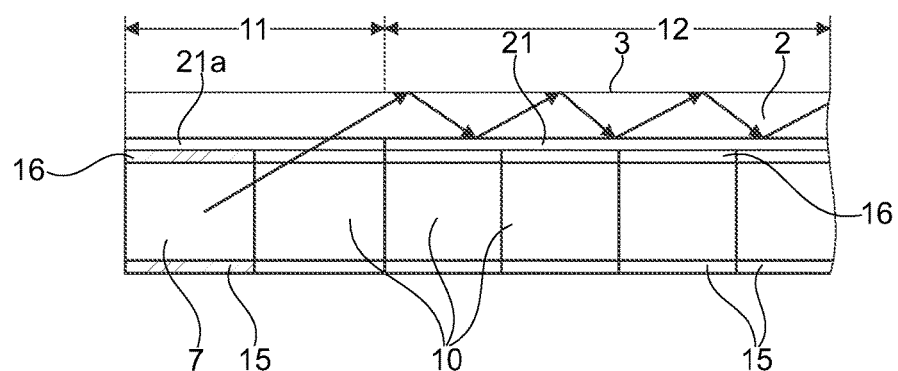
FIG. 6 is a partial section view of an alternative embodiment of the invention wherein the pixel elements are overlaid with an optical layer of lower reflective index.

FIG. 6 shows an alternative embodiment, which may be combined with any of the other embodiments of the invention. In this embodiment the pixel elements 10 are covered with an optical layer 21. As described in U.S. 2013/0127790, which is incorporated herein by reference, the TIR in the light guide 2 may be disturbed by the image forming pixel elements 10 as the refractive index of the image forming pixels 10 normally is higher than the refractive index of the light guide 2. The light may escape the light guide 2 via the rear surface 4 through the pixels 10 after reflection in the front surface 3. For this purpose, an optical layer 21 may be disposed between the rear surface 4 of the light guide 2 and the top electrode 16 (e.g. cathode) of the image-forming pixels 10. In one embodiment this optical layer 21 is made from a material which has a refractive index which is lower than the refractive index of the light guide 2. That way, there will be TIR in the light guide 2 at both the front surface 3 and the rear surface 4, provided that the angle of incidence is wide enough. As an example, the optical layer 21 may be provided by means of a resin used as a cladding material for optical fibers. Such a resin layer may be provided on the light guide 2 before deposition of the electrode and organic layers. Alternatively, if the OLED structure is built from a bottom sheet or plate, the optical layer 21 may be provided on the lower face 4 of the light guide 2 before attachment over the OLEDs, or over the OLEDs before attachment of the light guide 2. Another example of an optical layer 21 with a lower refractive index is an air gap.

In an alternative embodiment an extension portion 21a of the optical layer 21 is provided over the emitters 7 and detectors 8 and preferably over the aperture cells 50 or display elements 10 adjacent to the emitters 7 and detectors 8. The extension portion 21a preferably has the same thickness as the optical layer 21, which will make it easier to produce the OLEDs in the peripheral region 11 and in the central region 12 in the same process, since they will be provided at the same level. This extension portion 21a has a refractive index which is higher than the refractive index of the optical layer 21. This way, light may be injected into the light guide 2 through the extension portion 21a and then be internally reflected at the rear surface 4 where it faces the optical layer 21, provided that the angle of incidence is large enough. The refractive index of the extension portion 21a may e.g. be the same as the refractive index for the light guide 2. Alternatively, a material for the extension portion 21a may be chosen such that its refractive index lies between the refractive index for the light guide 2 and the refractive index for the emitter 7 and/or the detector 8.

Figure 7:
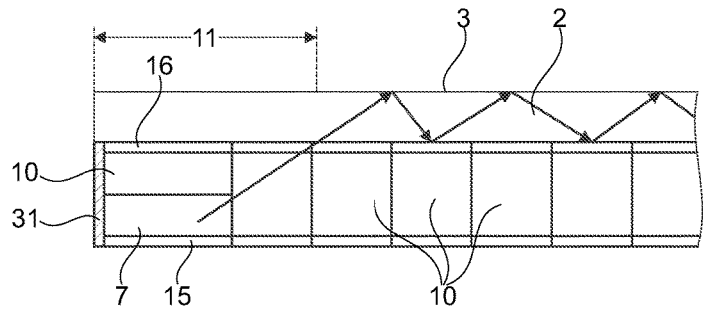
FIG. 7 is a partial section view of an alternative embodiment of the invention, illustrating emitters stacked with pixel elements.

FIG. 7 shows an embodiment where the emitter 7 is stacked with an image forming pixel element 10. As shown, the emitter is stacked underneath the pixel element. Light from the pixel element 10 will be emitted via the light guide 2. The emitter has a reflective layer at the interphase to the pixel element, so that light from the emitter is forced to be emitted via an adjacent pixel element towards the light guide 2. As in the other embodiments, the light from the emitter may be emitted via an aperture cell 50 instead of a pixel element. Detectors 8 may also be stacked under pixel elements 10. An advantage of the stacked embodiment is that the emitters and the detectors do not take the place of image forming elements 10 on the display unit 6. In alternative embodiments only emitters 7 or only detectors 8 are stacked underneath the image forming pixel elements 10. This embodiment can be combined with larger emitters 7 and with larger detectors 8. An emitter 7 or a detector 8 is then stacked with several pixel elements 10.

Figure 8:
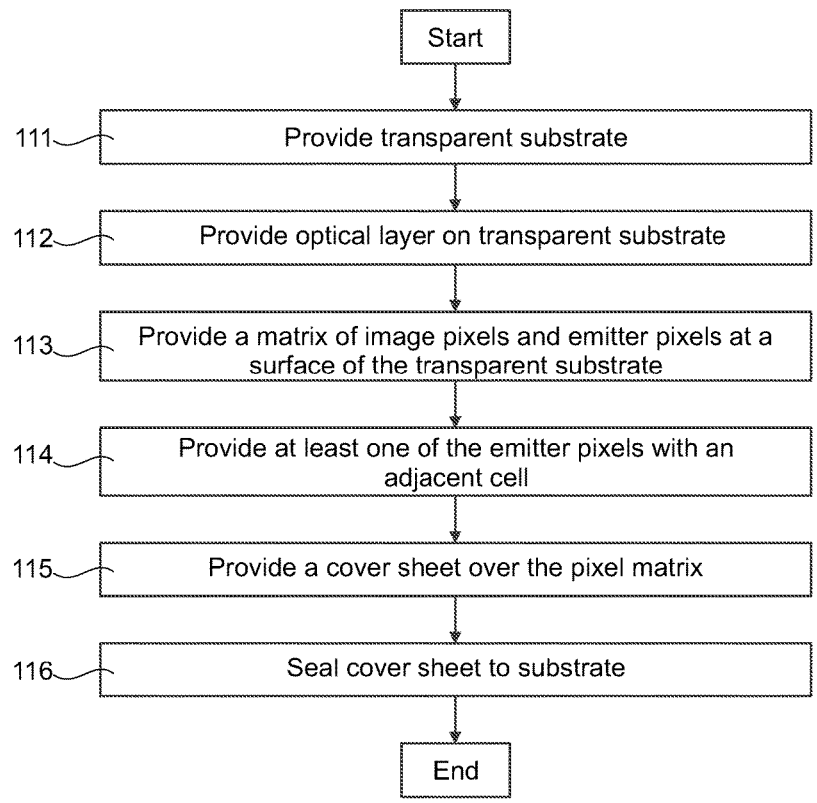
FIG. 8 is a flow chart of a method for producing a touch-sensing FTIR system according to the invention.
Figure 9:
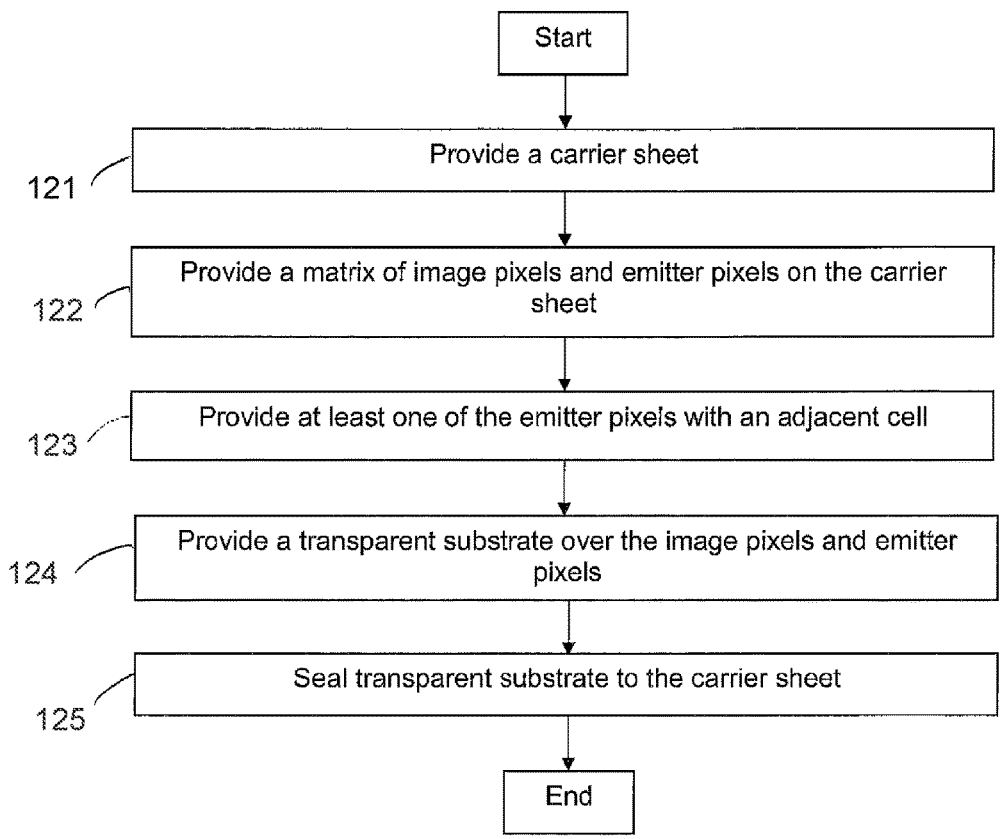
FIG. 9 is a flow chart of an alternative method for producing a touch-sensing FTIR system according to the invention.

FIGS. 8-9 outline some steps included in embodiments of a method of producing a touch-sensing display panel 1 in accordance with the invention. FIG. 8 relates to a method of producing a pixel matrix that starts from an anode side, and FIG. 9 relates to a method of producing a pixel matrix starting at a cathode side, according to known alternative principles within the industry. In a preferred embodiment, those pixels are OLEDs.

Following the embodiment of FIG. 8, step 111 involves providing a transparent substrate 2 having a refractive index. This transparent substrate 2 will serve as the FTIR light guide in the final product, with a front surface 3 providing the touch-sensitive region, potentially with additional functional layers on it. The substrate 2 may e.g. be made of a suitable glass material, of PMMA, PC, or other transparent material.

In a subsequent step 112, which may be omitted, an optical layer 21 is provided on a rear surface 4 of the substrate at a central region 12. The optical layer has a refractive index that is lower than the refractive index of the transparent substrate 2. The optical layer 21 may e.g. be a resin or an adhesive attached to the rear surface 4. Alternatively, the optical layer 21 may be formed in e.g. a vapor deposition process. The difference in refractive index need not be large. As a mere example, the refractive index of the substrate 2 may be between 1.5 and 1.6, and the refractive index of the optical layer 21 may be between 1.4 and 1.5. With reference to the preceding disclosure, the optical layer 21 may be added with an extension portion 21a at a peripheral region 11 around the central region 12. In such an embodiment, the refractive index of the extension portion 21a shall be higher than the refractive index of the optical layer 21.

In a subsequent step 113 a matrix of pixel elements is provided at the rear surface 4 over the central region 12 and over a peripheral region 11. According to processes well known in the art of OLED technology, such a process may include a TFT layer and possibly a TFT passivation layer thereon, before applying an anode layer. The anode of the emitters 7 and/or the detectors 8 may be made from a reflective material. Alternatively, if the anode of the emitters/detectors is made of the same transparent material as the anode of the pixel elements 10, a reflective layer 30 is applied to the anode layer of the emitters/detectors. One or more organic layers are then built up, typically including an emissive layer but selectively also transport layers and blocking layers.

In step 114, which may be overlapping with step 113, emitter pixels 7 are provided with an adjacent cell. In embodiments where transparent aperture cells 50 are used adjacent to emitters 7 to allow light from the emitters 7 to propagate into the transparent substrate 2, these transparent aperture cells 50 are provided in this step. The aperture cells 50 may be provided by building organic material using the same process as when building the one or more organic layers. A cathode layer is then provided to create the polarity of the OLED cell.

In step 115 a cover sheet is provided over the pixel matrix. This may be realized by means of an assembly of a rigid or flexible solid sheet, by coating the pixel matrix with a curable liquid, or in a vapor deposition process.

In step 116, the cover sheet is sealed to the substrate 2, so as to obtain a hermetic encapsulation. This sealing is made using a peripheral seal, while still providing means for a galvanic connection to the pixel matrix, e.g. by means of a flex film connection. It should be noted that the steps of providing the cover sheet and sealing it may at least to some extent be performed concurrently with each other.

The embodiment of FIG. 9 begins at the other end, with the step 121 of providing a carrier sheet. This carrier sheet will form the backside of the touch-sensing display panel 1, and while it therefore does not need to be transparent, it may still be made of glass, a plastic material, a metal such as aluminum, etc.

Step 122 includes providing a matrix of pixels on the carrier sheet. This will be a process which has a reversed order in comparison with the process of FIG. 8, beginning with the cathode layer. Otherwise it may include the same type of electrode layers and organic layers, as is known in the art. Organic layers are built up on the cathode layer. An anode layer is provided onto the organic layers. The anode layer over emitters 7 and optionally over detectors 8 may be a reflective anode layer. Alternatively, a reflective layer may be added onto the anode layer of the emitters 7.

In step 123, adjacent cells, e.g. transparent aperture cells 50, are provided, in a manner similar to step 113 in FIG. 8.

In step 124, a transparent substrate 2 having a refractive index over the pixels is then provided, which may have an intermediate optical layer 21 at a central region 12 of the substrate within a peripheral region 11. The optical layer 21 has a refractive index which is lower than the refractive index of the substrate 2. As outlined above, the optical layer 21 may be applied to the backside 4 of the substrate 2 and then attached over the pixels. Alternatively, the optical layer 21 may first be coated onto the pixel matrix, after which the substrate 2 is attached. Also, as noted with reference to FIG. 8, an extension portion 21a may be provided over the peripheral region 11, adjacent to the optical layer 21.

In step 125, the transparent substrate is sealed to the carrier sheet. As in the embodiment of FIG. 8, this will include a peripheral seal and the provision of a connector to the electrode layers for driving of the pixel matrix. Again, the steps of providing the substrate 2 and sealing it may at least to some extent be performed concurrently with each other.

The process step of FIGS. 8 and 9, respectively, deal with the provision of the layered structure according to the invention. In order to become a final working product, the layered structure must also be connected and driven so as to enable the use of the panel 1 both for image reproduction and touch-sensing.

Figure 10:
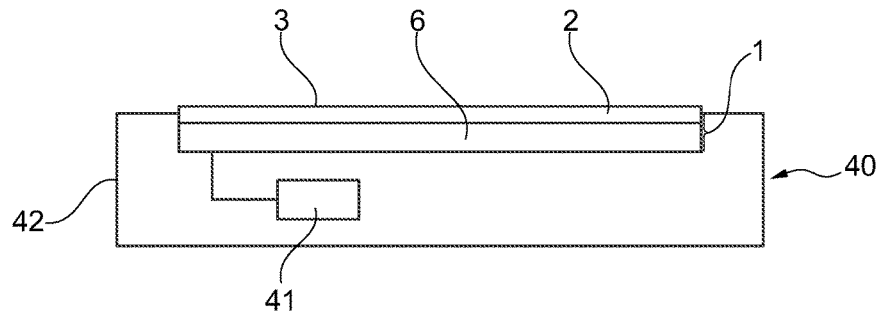
FIG. 10 is a schematic view of a touch-sensing FTIR system according to the invention.

FIG. 10 is a section view of a touch-sensing display apparatus 40, which comprises the display panel 1, including the light transmissive light guide 2 and a pixel matrix 6, and a signal processor 41, which are arranged in an enclosure 42 such that the light guide 2 forms a transparent front cover of the display apparatus 40. The signal processor 41 is a processing element (or means) which is connected to the display panel 1 so as to transmit control signals to the pixels, the emitters and the detectors, as well as to acquire output signals from the detectors. The signal processor 41 is also operable to generate and output touch data calculated based on the output signals. It is to be understood that the signal processor 41 may alternatively be implemented as a dedicated controller for the pixels and a dedicated controller for the emitters and the detectors.

It is to be understood that the display apparatus/display unity may form part of any form of electronic device, including but not limited to a laptop computer, an all-in-one computer, a handheld computer, a mobile terminal, a gaming console, a television set, etc. Such an electronic device typically includes a processor or similar controller that may be connected to control the display panel 1 to display information content within at least part of the touch surface 3 and to provide touch sensitivity within the touch surface 3. The controller may be implemented to control the display panel 1 via the signal processor 41, or it may implement part or all of the functionality of the signal processor 41.

Figure 11:
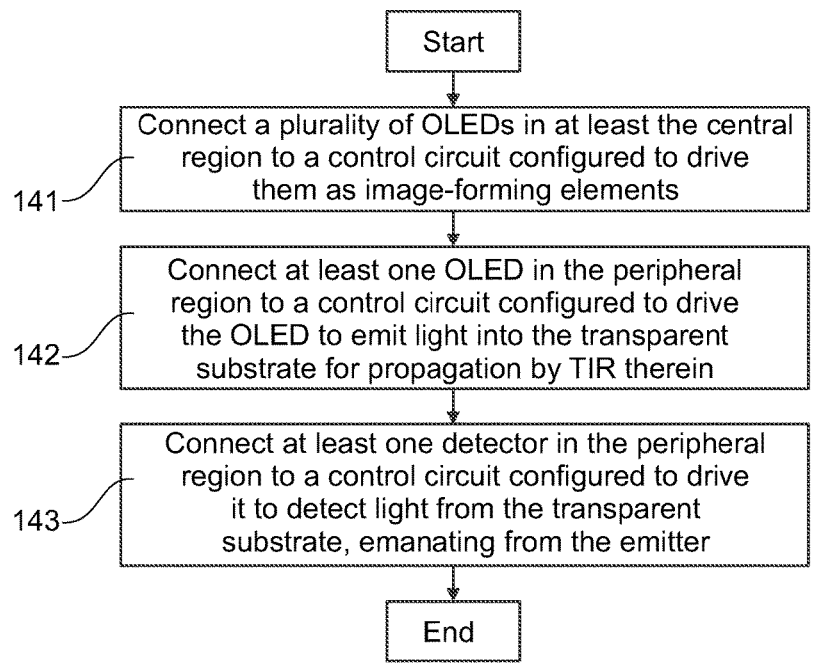
FIG. 11 is a flow chart of a method of connecting a display to a processor in a touch-sensing FTIR system of the invention.

FIG. 11 shows a number of steps, which need not be provided in the given order, that may be included in any one of the embodiments of FIGS. 8 and 9, so as to create a functional connection of the display panel 1 to a signal processor 41.

In step 141 a plurality of pixels 10 are connected to a control circuit 41 configured to drive them as image-forming pixel elements. As noted before, these image-forming elements are preferably all disposed under the optical layer 21, and may to some extent also be provided in the peripheral region 11. Collectively, the image-forming elements 10 form the display part of the panel 1.

In step 142 at least one pixel 7 in the peripheral region 11 is connected to a control circuit 41 configured to drive the pixel 7 to emit light into the transparent substrate 2 for propagation by TIR therein. Preferably, a number of emitters 7 are connected this way, provided in the peripheral region along at least two sides of the panel 1.

In step 143 at least one detector 8 in the peripheral region 11 is connected to a control circuit 41 configured to drive that detector 8 to detect light from the transparent substrate 2, emanating from the emitter 7. Correspondingly, a number of detectors 8 are preferably connected this way, provided in the peripheral region along at least two sides of the panel 1. Together with the emitters 7, they will form the touch-sensing detection grid of the touch surface 3.

Figure 12:
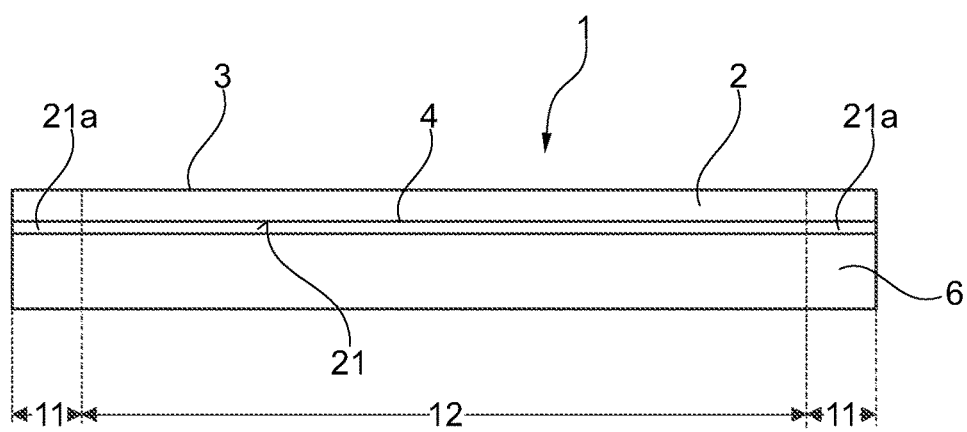
FIG. 12 is a side view of a touch-sensing FTIR system, comprised of a combined display and touch-sensing panel, formed by attaching a light guide to a display.

Reference will now be made to the embodiment of FIG. 12, illustrating a side view of an FTIR system of a combined display and touch-sensing panel 1, formed by attaching a light guide 2 to a display 6. The light guide 2 may be bonded to the display unit 6 by means of an adhesive, such as an optical adhesive. In one embodiment, the light guide 2 is laminated onto the display unit 6. The adhesive used for bonding or laminating the light guide 2 to the display unit 6 may have the function of the optical layer 21, which optical layer has been discussed previously in this application. To enable the light from the emitters 7 to be coupled into and out of the light guide 2 at the peripheral region 11, while enabling the light to propagate by TIR across the light guide above the center region 12, different adhesives may be used in the peripheral region 11 and the center region 12. Specifically, the adhesive 21 in the center region 12 may be selected to have an index of refraction that is lower than the index of refraction of the light guide 2, while the adhesive 21*a* in the peripheral region 11 may be selected to have an index of refraction that is higher or substantially equal to the index of refraction of the light guide 2. The adhesive 21*a* may have the function of the extension layer 21*a*, previously discussed.

In a variant, the light guide 2 is attached by an adhesive 21*a* to the display unit 6 at the peripheral region 11 only and arranged with an air gap 21 to the center region 12 of the display unit 6. It is currently believed that an air gap of at least about 2-3 µm is sufficient to enable propagation by TIR in the light guide 2. This variant may facilitate removal and replacement of the light guide 2 in the course of service and maintenance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the touch-sensing display panel may be provided with a reflective material between back substrate and the aperture cells in the periphery 11. This may be applied as a coating of reflective material. The reflective material may also extend into the main part 12 of the display, and thereby be provided between the back substrate and the pixel elements 10. The reflective material will reflect emitted light that is emitted in other directions than towards the light guide 2, and may thereby increase the amount of light that can be used for touch detection.

The combined touch-sensing display panel FTIR system may also include structures configured to re-direct the light emitted by the emitters 7, e.g. to reshape the emitted cone of light so as to increase the amount of light coupled into the light guide 2 in a desired fashion. For example, the emitted light may be redirected so as to form the fan beam in the plane of the light guide 2, as shown in FIG. 3, and/or the emitted light may be redirected to increase the amount of light that is trapped by TIR in the light guide 2. These light-directing structures may be included in the portion of the surface 4 that faces the peripheral region 11 of the display unit 6. Alternatively, the light-directing structures may be applied as a film layer onto the peripheral parts of the light guide 2. Similar light-directing structures may be included between the light guide 2 and the detectors 8, so as to redirect outcoupled light onto the detectors 8. Generally, the light-directing structures may be said to define the field of view of the emitter/detector 7, 8 inside the light guide 2. The light-directing structures may be in the form of micro-structured elements, such as but not limited to, reflectors, prisms, gratings or holographic structures. The micro-structured elements may be etched, printed, hot embossed, injection molded, pressure molded or otherwise provided between the emitters/detectors 7, 8 and the light guide 2.

With reference to the figures, the emitter 7 has been shown and described as having the reflective material, i.e. the reflective anode/cathode or a reflective layer, in a plane parallel to the touch surface. It is to be noted that the wanted result will be achieved at least partly when the reflective material is in a plane that is inclined with relation to the plane of the touch surface with between 0 and 45 degrees. In some embodiments this may be advantageous as the inclination may be chosen so that the light is emitted into the light guide at a preferred angle.

Although it may be preferable that the emitter(s) 7 and the detector(s) 8 are implemented by the same technology as used for generating images in the display area, e.g. to have similar functional structure as the pixels 10, it is also possible that the emitter(s) 7 or the detector(s) 8, are implemented by a different technology when integrated into the display unit 6.

As noted above, it may be desirable that the surface area of the emitters and detectors is larger than the surface area of the pixels. It is to be understood that the emitters may be larger than the detectors, and vice versa, and also that the emitters and detectors may have any shape, including circular, elliptical, and polygonal.

Although the example embodiments of the invention shows emitters 7 near the peripheral parts of the display it should be noted that the emitters 7 could be interleaved with the display pixels 10. It is conceivable that the emitters 7 are interleaved with the display pixels 10 near the peripheral parts of the display area. The emitters 7 may alternatively be interleaved with the display pixels 10 in other parts of the display area.

What is claimed is:

1. A touch-sensitive display, comprising:
   a transmissive panel defining the touch surface;
   a first set of OLED emitters forming display pixels;
   a second set of OLED emitters configured to emit light via an adjacent cell into the transmissive panel for propagation therein via total internal reflection, each of the second set of OLED emitters comprise a top surface proximate with a bottom surface of the transmissive panel, a bottom surface opposite the top surface, a first side surface proximate to the adjacent cell, and a second side surface opposite the first side surface,
   wherein the top, the bottom, and the second side surfaces comprise a reflective material, thereby preventing the emitted light from being emitted through the top surface and emitted into the transmissive panel only via the first side surface; and
   a set of detectors configured to receive light from the second set of OLED emitters after the light has propagated inside the transmissive panel via total internal reflection;
   wherein the first set and the second set of OLED emitters are arranged on the same substrate.

2. The touch-sensitive display of claim 1, wherein the adjacent cell is an OLED emitter of the first set.

3. The touch-sensitive display of claim 1, wherein the adjacent cell is a light transmissive aperture cell.

4. The touch-sensitive display of claim 3, wherein the light transmissive aperture cell comprises plastic material, transparent OLED carrier or OLED compound.

5. The touch-sensitive display of claim 1, wherein each OLED emitter of the second set is configured with an at least partially reflective layer between the transmissive panel and an active material of the OLED emitter of the second set.

6. The touch-sensitive display of claim 5, wherein the reflective layer is at least 70% reflective.

7. The touch-sensitive display of claim 5, wherein the reflective layer is less than 50% transmissive.

8. The touch-sensitive display of claim 5, wherein the reflective layer comprises silver.

9. The touch-sensitive display of claim 5, wherein the reflective layer comprises an anode or cathode of the OLED emitter.

10. The touch-sensitive display of claim 5, wherein the reflective layer is in a plane that is at an angle of 0-45 degrees to a plane of the touch surface.

11. The touch-sensitive display of claim 1, wherein the OLED emitter is configured with an anode and a cathode layer arranged perpendicular to the plane of the panel.

12. The touch-sensitive display of claim 1, wherein the touch-sensing display panel is provided with a reflective material between a back substrate and the aperture cell.

13. The touch-sensitive display of claim 1, wherein the touch-sensitive display comprises organic photo detectors.

14. A method of producing a touch sensitive display panel, comprising:
   providing a transparent substrate;
   providing a matrix of image pixels and emitter pixels at a surface of the substrate;
   providing at least one of the emitter pixels with an adjacent cell, configured to allow light to be emitted from the emitter pixel to the transparent substrate via the adjacent cell, the at least one of the emitter pixels comprise a top surface proximate with a bottom surface of the transmissive panel, a bottom surface opposite the top surface, a first side surface proximate to the adjacent cell, and a second side surface opposite the first side surface,
   wherein the top, the bottom, and the second side surfaces comprise a reflective material, thereby preventing the emitted light from being emitted through the top surface and emitted into the transmissive panel only via the first side surface;
   providing a cover sheet over the pixel matrix; and
   sealing the cover sheet to the substrate.

15. A method of producing a touch sensitive display panel, comprising:
   providing a carrier sheet;
   providing a matrix of image pixels and emitter pixels on the carrier sheet;
   providing at least one of the emitter pixels with an adjacent cell, the at least one of the emitter pixels comprise a top surface proximate with a bottom surface of the transmissive panel, a bottom surface opposite the top surface, a first side surface proximate to the adjacent cell, and a second side surface opposite the first side surface,
   wherein the top, the bottom, and the second side surfaces comprise a reflective material, thereby preventing the emitted light from being emitted through the top surface and emitted into the transmissive panel only via the first side surface;
   providing a transparent substrate over the image pixels and the emitter pixels; and
   sealing the transparent substrate to the carrier sheet;
   wherein the adjacent cell is configured to allow light to be emitted from the emitter pixel to the transparent substrate via the adjacent cell.

* * * * *